US008069699B2

(12) United States Patent  
Glenn et al.

(10) Patent No.: US 8,069,699 B2
(45) Date of Patent: Dec. 6, 2011

(54) INSTALLATION/PROCESSING SYSTEMS AND METHODS OF USING THE SAME

(75) Inventors: Douglas W. Glenn, Des Moines, WA (US); Jonathan M. Shafer, Issaquah, WA (US)

(73) Assignee: Fatigue Technology, Inc., Seattle, WA (US)

( * ) Notice: Subject to any disclaimer, the term of this patent is extended or adjusted under 35 U.S.C. 154(b) by 903 days.

(21) Appl. No.: 11/897,270

(22) Filed: Aug. 28, 2007

(65) Prior Publication Data

US 2008/0066518 A1 Mar. 20, 2008

Related U.S. Application Data

(60) Provisional application No. 60/840,738, filed on Aug. 28, 2006.

(51) Int. Cl.
B23P 19/02 (2006.01)
B21D 41/02 (2006.01)
B21D 39/06 (2006.01)

(52) U.S. Cl. ....... 72/391.2; 72/391.4; 72/393; 29/522.1; 29/525

(58) Field of Classification Search ................ 72/391.2, 72/391.4, 391, 393, 391.6; 29/243.518, 446, 29/522.1, 23, 243.525, 525
See application file for complete search history.

(56) References Cited

U.S. PATENT DOCUMENTS

| 295,593 A | 3/1884 | Thayer |
| 810,430 A | 1/1906 | Pfluger et al. |
| 1,081,496 A | 12/1913 | Gillmor |
| 1,106,964 A | 8/1914 | Pahler |
| 1,226,090 A | 5/1917 | Ludlum |
| 1,297,142 A | 3/1919 | Gibbons |
| 1,480,298 A | 1/1924 | Pearson |
| 1,881,867 A | 10/1932 | Nelson |
| 1,979,686 A | 11/1934 | Hall et al. .......................... 85/40 |
| 2,092,358 A | 9/1937 | Robertson ........................ 285/56 |
| 2,146,461 A | 2/1939 | Bettington ....................... 218/29 |
| 2,150,361 A | 3/1939 | Chobert ........................... 153/79 |
| 2,188,596 A | 1/1940 | Hobert ................................. 16/2 |
| 2,275,451 A | 3/1942 | Maxwell |
| 2,357,123 A * | 8/1944 | Maxwell ......................... 72/393 |

(Continued)

FOREIGN PATENT DOCUMENTS

| DE | 2203217 | 7/1973 |
| DE | 33 01 849 C1 | 7/1984 |
| DE | 3545554 A1 | 7/1987 |
| DE | 89 01 317 U1 | 3/1989 |
| EP | 0 054 592 A1 | 6/1982 |
| EP | 0 140 516 A1 | 5/1985 |

(Continued)

OTHER PUBLICATIONS

Merriam Webster's Collegiate Dictionary, Tenth Edition, 1997, p. 154. (1).

(Continued)

*Primary Examiner* — David Jones
(74) *Attorney, Agent, or Firm* — Seed Intellectual Property Law Group PLLC

(57) ABSTRACT

Installation/processing tools may be used to install one or more expandable structures in a workpiece. An installation/processing tool may include an expansion mandrel, a processing tool, and an expansion assembly having an expansion jaw movable between a collapsed configuration and an expanded configuration. An expandable portion of the expansion jaw is sized to fit within a passageway of an expandable member. When the mandrel is moved through the expansion assembly, the expansion jaw is moved between the collapsed and expanded configurations to cause expansion of the expandable member. The installation/processing tool can also be used to cold work a workpiece.

25 Claims, 14 Drawing Sheets

U.S. PATENT DOCUMENTS

| | | | | |
|---|---|---|---|---|
| 2,385,294 A | 9/1945 | Lowy | | 16/3 |
| 2,405,399 A * | 8/1946 | Bugg et al. | | 29/243.518 |
| 2,430,554 A | 11/1947 | Bugg et al. | | |
| 2,433,425 A | 12/1947 | Burckle | | 285/84 |
| 2,468,985 A | 5/1949 | Krotz | | 287/85 |
| 2,528,180 A | 10/1950 | Roehl | | 248/56 |
| 2,661,182 A | 12/1953 | Kipp | | 251/76 |
| 2,672,175 A | 3/1954 | Howard | | |
| 2,695,446 A | 11/1954 | Meyer | | 29/523 |
| 2,700,172 A | 1/1955 | Rohe | | 16/2 |
| 2,808,643 A | 10/1957 | Weatherhead, Jr. | | 29/508 |
| 2,943,667 A | 7/1960 | Ewing et al. | | |
| 3,128,999 A | 4/1964 | Schmitt | | 267/1 |
| 3,137,887 A | 6/1964 | Mannino et al. | | 16/2 |
| 3,149,860 A | 9/1964 | Hallesy | | 285/18 |
| 3,164,054 A | 1/1965 | Biesecker | | 85/8.8 |
| 3,244,034 A | 4/1966 | Severdia | | 77/62 |
| 3,252,493 A | 5/1966 | Smith | | 151/41.7 |
| 3,345,730 A * | 10/1967 | Laverty | | 29/243.518 |
| 3,358,492 A | 12/1967 | Richter | | |
| 3,434,746 A | 3/1969 | Watts | | 285/162 |
| 3,498,648 A | 3/1970 | Hallesy | | 285/343 |
| 3,537,163 A | 11/1970 | Steidl | | 29/149.5 |
| 3,566,662 A | 3/1971 | Champoux | | 72/370 |
| 3,674,292 A | 7/1972 | Demler, Sr. | | 285/174 |
| 3,693,247 A | 9/1972 | Brown | | 29/512 |
| 3,778,090 A | 12/1973 | Tobin | | 285/222 |
| 3,787,945 A | 1/1974 | Pasek et al. | | 29/157.4 |
| 3,820,297 A | 6/1974 | Hurd | | 52/758 F |
| 3,835,525 A | 9/1974 | King, Jr. | | 29/412 |
| 3,875,649 A | 4/1975 | King, Jr. | | 29/418 |
| 3,892,121 A | 7/1975 | Champoux et al. | | 72/393 |
| 3,895,409 A | 7/1975 | Kwatonowski | | 16/2 |
| 3,915,052 A | 10/1975 | Ruhl | | 85/7 |
| 3,934,325 A | 1/1976 | Jaffe | | 29/243.52 |
| 3,949,535 A | 4/1976 | King, Jr. | | 52/758 D |
| 3,997,193 A | 12/1976 | Tsuda et al. | | 285/47 |
| 4,143,580 A | 3/1979 | Luhm | | 85/77 |
| 4,164,807 A | 8/1979 | King, Jr. | | 29/523 |
| 4,187,708 A | 2/1980 | Champoux | | 72/30 |
| 4,249,786 A | 2/1981 | Mahoff | | 339/15 |
| 4,355,612 A | 10/1982 | Luksch | | 123/41.08 |
| 4,386,515 A * | 6/1983 | Starke | | 72/391.4 |
| 4,397,061 A | 8/1983 | Kanzaka | | 16/2 |
| 4,405,256 A | 9/1983 | King, Jr. | | 403/408 |
| 4,423,619 A | 1/1984 | Champoux | | 72/393 |
| 4,425,780 A | 1/1984 | Champoux | | 72/370 |
| 4,447,944 A | 5/1984 | Mohrman | | 29/512 |
| 4,471,643 A | 9/1984 | Champoux et al. | | 72/391 |
| 4,482,089 A | 11/1984 | Lindahl et al. | | 228/173 C |
| 4,522,378 A | 6/1985 | Nelson | | 267/141.4 |
| 4,524,600 A | 6/1985 | Champoux et al. | | 72/391 |
| 4,530,527 A | 7/1985 | Holmberg | | 285/382.4 |
| 4,557,033 A | 12/1985 | Champoux | | 29/525 |
| 4,583,388 A | 4/1986 | Hogenhout | | |
| 4,597,282 A | 7/1986 | Hogenhout | | |
| 4,640,479 A | 2/1987 | Shely et al. | | 248/56 |
| 4,665,732 A | 5/1987 | Hogenhout | | |
| 4,699,212 A | 10/1987 | Andersson et al. | | 165/167 |
| 4,759,237 A | 7/1988 | Fauchet et al. | | 81/53.2 |
| 4,787,793 A | 11/1988 | Harris | | 411/339 |
| 4,809,420 A | 3/1989 | Landy et al. | | 29/523 |
| 4,869,091 A | 9/1989 | Shemeta | | |
| 4,885,829 A | 12/1989 | Landy | | 29/156.8 R |
| 4,905,766 A | 3/1990 | Dietz et al. | | 169/91 |
| 4,934,038 A | 6/1990 | Caudill | | |
| 4,934,170 A | 6/1990 | Easterbrook et al. | | 72/370 |
| 4,985,979 A | 1/1991 | Speakman | | 29/512 |
| 4,999,896 A | 3/1991 | Mangus et al. | | 29/34 B |
| 5,038,596 A | 8/1991 | Noonan et al. | | 72/391.4 |
| 5,069,586 A | 12/1991 | Casey | | 411/339 |
| 5,083,363 A | 1/1992 | Ransom et al. | | 29/523 |
| 5,093,957 A | 3/1992 | Do | | 16/2 |
| 5,096,349 A | 3/1992 | Landy et al. | | 411/108 |
| 5,103,548 A | 4/1992 | Reid et al. | | 29/507 |
| 5,110,163 A | 5/1992 | Benson et al. | | 285/382.2 |
| 5,127,254 A | 7/1992 | Copple et al. | | 72/370 |
| 5,129,253 A | 7/1992 | Austin et al. | | 72/370 |
| 5,207,461 A | 5/1993 | Lasko | | 285/222 |
| 5,218,854 A | 6/1993 | Jarzebowicz et al. | | 72/370 |
| 5,245,743 A | 9/1993 | Landy et al. | | 29/523 |
| 5,253,773 A | 10/1993 | Choma et al. | | 230/86.2 |
| 5,305,627 A | 4/1994 | Quincey et al. | | 72/370 |
| 5,341,559 A | 8/1994 | Reid et al. | | 29/523 |
| 5,380,111 A | 1/1995 | Westrom | | 411/183 |
| 5,380,136 A | 1/1995 | Copple et al. | | 411/183 |
| 5,390,808 A | 2/1995 | Choma et al. | | 220/86.2 |
| 5,405,228 A | 4/1995 | Reid et al. | | 411/183 |
| 5,433,100 A | 7/1995 | Easterbrook et al. | | 72/391.2 |
| 5,466,016 A | 11/1995 | Briody et al. | | 285/204 |
| 5,478,122 A | 12/1995 | Seabra | | 285/281 |
| 5,607,194 A | 3/1997 | Ridenour | | 285/334.5 |
| 5,609,434 A | 3/1997 | Yehezkieli et al. | | 403/260 |
| 5,713,611 A | 2/1998 | Kurimoto et al. | | 285/382.5 |
| 5,722,312 A | 3/1998 | Kristensen | | 92/171.1 |
| 5,806,173 A | 9/1998 | Honma et al. | | |
| 5,885,318 A | 3/1999 | Shimizu et al. | | 65/493 |
| 5,943,898 A | 8/1999 | Kuo | | 72/370.07 |
| 5,947,326 A | 9/1999 | O'Hern et al. | | 220/802 |
| 6,058,562 A | 5/2000 | Satou et al. | | 16/2.1 |
| 6,131,964 A | 10/2000 | Sareshwala | | 285/382 |
| 6,217,082 B1 | 4/2001 | Orcutt et al. | | 285/272 |
| 6,266,991 B1 | 7/2001 | Kuo | | |
| 6,289,577 B1 | 9/2001 | Tanaka et al. | | 29/603.03 |
| 6,328,513 B1 | 12/2001 | Niwa et al. | | 411/339 |
| 6,347,663 B1 | 2/2002 | Hunzinger et al. | | 165/178 |
| 6,488,460 B1 | 12/2002 | Smith et al. | | 411/353 |
| 6,499,926 B2 | 12/2002 | Keener | | 411/504 |
| 6,623,048 B2 | 9/2003 | Castel et al. | | 285/382 |
| 6,651,301 B1 | 11/2003 | Liu | | 29/243.521 |
| 6,705,149 B2 | 3/2004 | Cobzaru et al. | | 72/391.4 |
| 6,761,380 B2 | 7/2004 | Pachciarz et al. | | 285/204 |
| 6,773,039 B2 | 8/2004 | Muenster et al. | | 285/259 |
| 6,796,765 B2 | 9/2004 | Kosel et al. | | 415/142 |
| 6,826,820 B2 | 12/2004 | Denham et al. | | 29/524.1 |
| RE38,788 E | 9/2005 | Satou et al. | | 16/2.1 |
| 7,024,908 B2 | 4/2006 | Poast et al. | | 72/391.2 |
| 7,047,596 B2 | 5/2006 | Sucic et al. | | 16/2.1 |
| 7,059,816 B2 | 6/2006 | Toosky | | 411/181 |
| 7,100,264 B2 | 9/2006 | Skinner et al. | | 29/523 |
| 7,406,777 B2 | 8/2008 | Grover et al. | | 33/645 |
| 7,617,712 B2 | 11/2009 | Glenn | | 72/391.4 |
| 2004/0111864 A1 | 6/2004 | Skinner et al. | | 29/523 |
| 2005/0025601 A1 | 2/2005 | Poast et al. | | 411/15 |
| 2007/0110541 A1 | 5/2007 | Rawlins et al. | | 411/54.1 |
| 2007/0289351 A1 | 12/2007 | Glenn | | 72/370.07 |
| 2008/0005887 A1 | 1/2008 | Glenn et al. | | 29/523 |
| 2008/0034831 A1 | 2/2008 | Glenn | | 72/370.07 |
| 2008/0250603 A1 | 10/2008 | Skinner et al. | | 16/2.2 |

FOREIGN PATENT DOCUMENTS

| | | |
|---|---|---|
| EP | 0 248 122 A2 | 12/1987 |
| EP | 0 891 007 A1 | 1/1999 |
| EP | 0 945 919 B1 | 9/1999 |
| EP | 1166951 A1 | 1/2002 |
| EP | 1 202 458 A1 | 5/2002 |
| EP | 1525952 A1 | 4/2005 |
| EP | 1611976 A1 | 1/2006 |
| EP | 1 903 221 A2 | 3/2008 |
| FR | 2645052 | 10/1990 |
| GB | 593607 | 10/1947 |
| GB | 1395009 | 5/1975 |
| GB | 2 239 917 A | 7/1991 |
| JP | 57137031 | 8/1982 |
| JP | 60238046 A | 11/1985 |
| JP | 61157846 | 7/1986 |
| SU | 632463 | 11/1978 |
| WO | 8400120 A1 | 1/1984 |
| WO | 2007082077 A1 | 7/2007 |
| WO | 2007121932 A1 | 11/2007 |

OTHER PUBLICATIONS

U.S. Appl. No. 09/603,857, filed Jun. 26, 2000, Skinner et al.

* cited by examiner

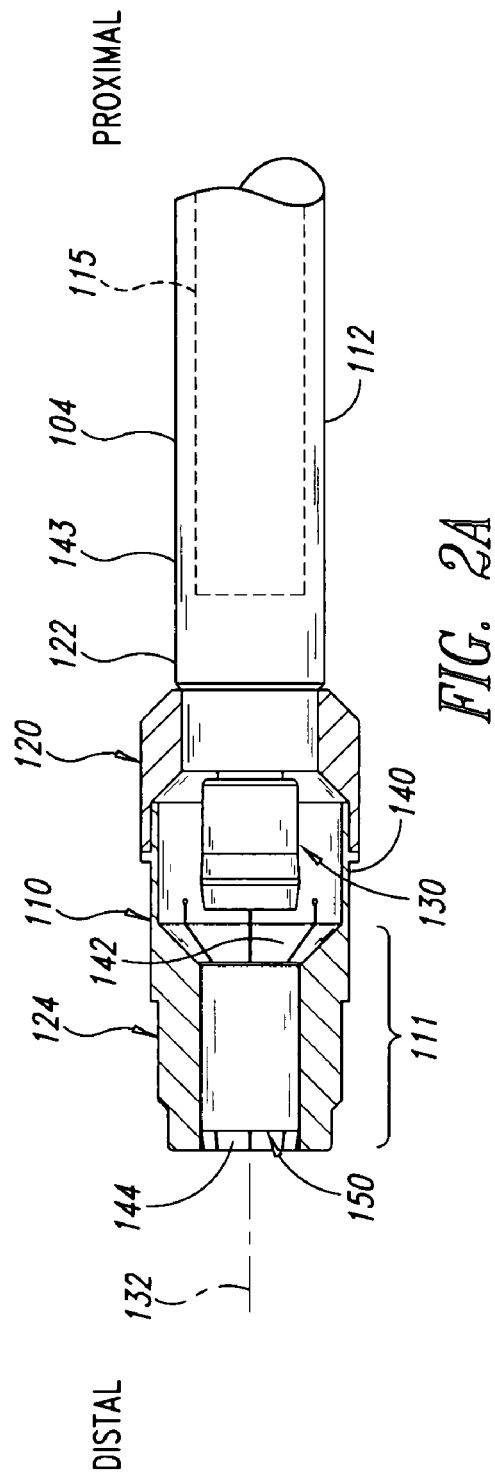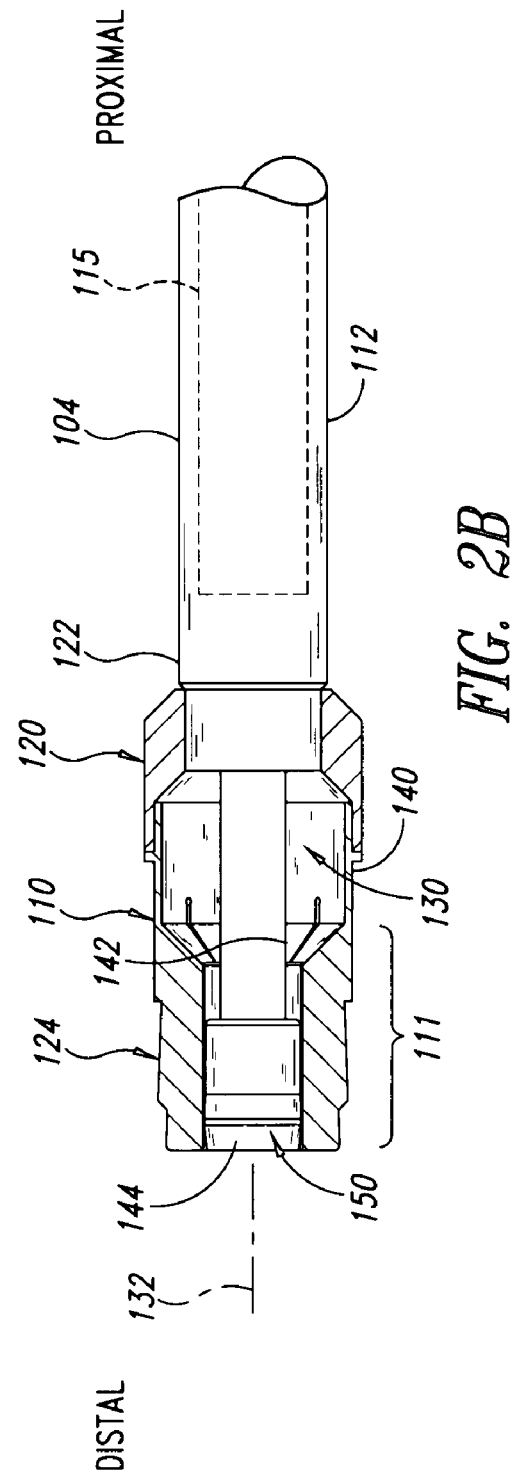

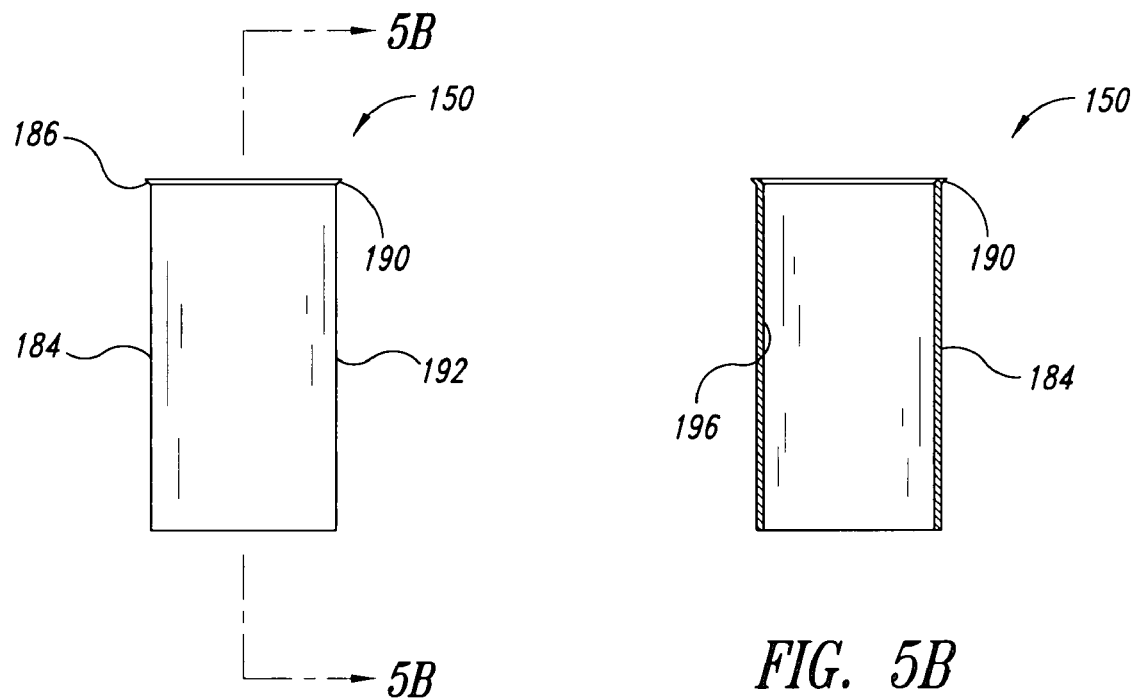
FIG. 5A
FIG. 5B
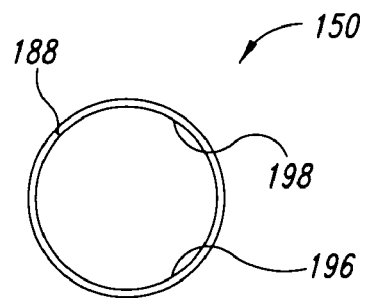
FIG. 5C

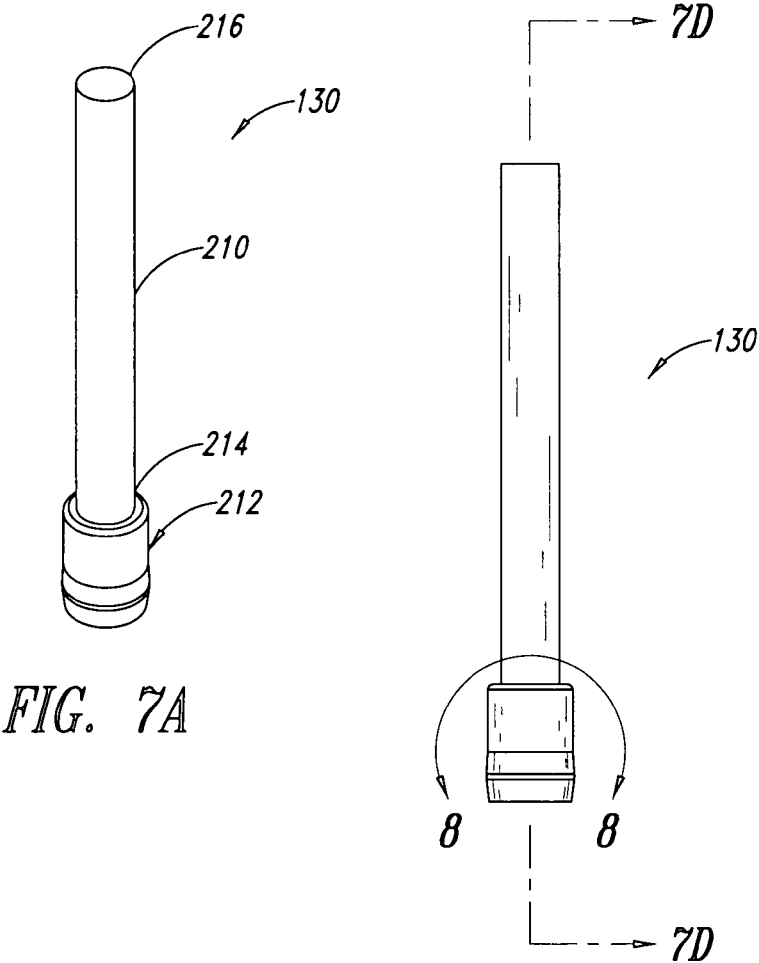
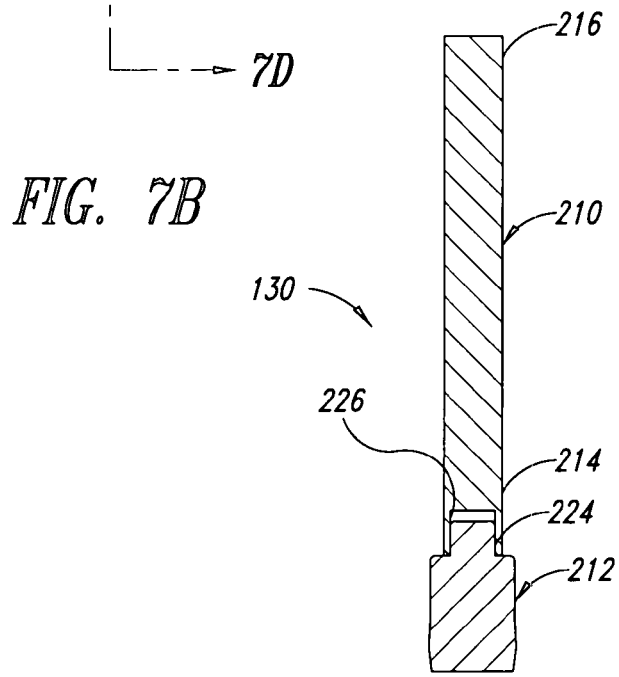
FIG. 7A
FIG. 7B
FIG. 7C
FIG. 7D

US 8,069,699 B2

INSTALLATION/PROCESSING SYSTEMS AND METHODS OF USING THE SAME

CROSS-REFERENCE TO RELATED APPLICATION

This application claims the benefit under 35 U.S.C. §119(e) of U.S. Provisional Patent Application No. 60/840,738 filed Aug. 28, 2006, which is incorporated herein by reference in its entirety.

BACKGROUND OF THE INVENTION

1. Field of the Invention

This disclosure generally relates to installation/processing systems for installing expandable members into holes and/or cold expanding holes.

2. Description of the Related Art

Conventional installation tools are used to install bushings in holes within workpieces. These installation tools often have an expansion mandrel with an enlarged tapered portion used to expand the bushing. To radially expand the bushing, the expansion mandrel is inserted into an opening in the bushing. The bushing and mandrel are simultaneously inserted into a hole in a workpiece. When the bushing is positioned in the hole of the workpiece, the enlarged tapered portion of the mandrel extends outwardly from the backside of the workpiece. These types of installation tools thus require an adequate amount of backside clearance and are unsuitable for installing bushings in non-through holes, blind holes, or other holes having limited backside clearance.

To expand the bushing, the enlarged tapered portion of the mandrel is forcibly pulled axially through the opening of the bushing until an interference fit is formed between the bushing and workpiece. Unfortunately, relatively high frictional forces can be generated as the mandrel is moved through the bushing. These forces may cause the bushing to move relative to the workpiece, thus resulting in improper positioning of the installed bushing. Additionally, as the mandrel is pulled through the bushing, the outer surface of the mandrel can abrade the sidewall of the bushing's opening, thereby reducing the quality of the installed bushing.

Other installation tools use a threaded installation member to install a partially collapsible fastener element. The partially collapsible fastener element is inserted into a through hole in a workpiece until a first flange at a trailing end of the fastener element is in contact with a front face of the workpiece. Unfortunately, a collapsible portion of the fastener element has to extend outwardly from the backside of the workpiece, thus requiring a through hole having sufficient backside clearance.

Once the fastener element is positioned in the workpiece, an externally threaded end of the threaded installation member is inserted into an opening in the fastener element from the front side of the workpiece. The installation member is threadably mated with internal threads of the fastener element such that both the installation member and fastener element extend beyond the backside of the workpiece.

A tubular mandrel surrounding the installation member is moved into contact with an entrance of the opening in the fastener element. A puller device retracts the installation member through the tubular mandrel to cause the collapsible portion (e.g., a reduced thickness wall portion) of the fastener element to collapse and form a second flange on the backside of the workpiece. The workpiece is thus sandwiched between the first and second flanges of the fastener element. Unfortunately, during this process, the puller device is pulled against the front surface of the workpiece and may deform, mar, or otherwise degrade the front surface of the workpiece.

The tubular mandrel is moved axially into the opening of the fastener element causing radial expansion of a portion of the fastener element. The portion of the fastener element is radially expanded against the sidewall of the opening to form an interference fit. During this expansion process, the mandrel directly contacts and slides against the fastener element and, consequently, can undesirably abrade and damage the surface of the fastener element.

Consequently, conventional installation tools may not adequately meet certain quality and installation needs.

BRIEF SUMMARY OF THE INVENTION

In some embodiments, a processing system is configured to install expandable members into holes and/or to cold expand holes. The holes can be blind holes or other types of holes with limited back side clearance or access.

In some embodiments, an expansion jaw for processing a workpiece comprises a main body having a first end, an opposing second end, and a plurality of longitudinally-extending elongate members coupled to the second end of the main body. The elongate members can be moved outwardly during an installation process.

In some embodiments, an expansion jaw for processing a workpiece comprises a main body having a first end and an opposing second end, a plurality of longitudinally-extending elongate members coupled to the second end of the main body, each of the elongate members resiliently movable between a collapsed position and an expanded position, and an expansion jaw passageway dimensioned to receive an expansion mandrel. In some arrangements, the passageway comprises a first passageway section having a first cross-sectional area extending through the main body, and a second passageway section connected to the first passageway section, the second passageway section surrounded by the plurality of elongate members, at least a portion of the second passageway section has a second cross-sectional area that is less than the first cross-sectional area of the first passageway section such that each of the elongate members moves between the collapsed position and the expanded position when an expansion mandrel is moved through the second passageway section.

In some embodiments, a system for processing a workpiece comprises an expansion mandrel having a distal portion and a proximal portion, the proximal portion configured to engage an actuating device, and an expansion jaw having an expandable portion connected to a main body, a passageway extending through the expandable portion and the main body, the passageway comprises a narrowed section positioned along the expandable portion such that the expandable portion resiliently expands outwardly an amount sufficient to install an expandable member or cold expand a hole in the workpiece when the distal portion of the expansion mandrel is moved distally through the passageway.

In yet other embodiments, an installation assembly comprises a main body having a passageway for receiving an expansion mandrel and means for expanding a member in a workpiece when the expansion mandrel is moved through at least a portion of the means for expanding, the means for expanding dimensioned to fit within a hole in the member, and the means for expanding being coupled to the main body.

In some embodiments, a method of expanding an expandable member comprises positioning an expansion assembly in a hole of the expandable member, expanding the expandable member from a first configuration to a second configuration by moving an expansion mandrel in a first direction through an expandable jaw of the expansion assembly such that an expandable portion of the expansion jaw positioned in the hole expands the expandable member, wherein the expandable member is expanded while the expandable jaw is generally axially fixed relative to the expandable member. After expanding the expandable member, the expansion mandrel is moved in a second direction opposite the first direction causing the expandable portion of the expansion jaw to collapse inwardly an amount sufficient to allow removal of the expansion assembly from the expanded expandable member.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2A is a partial sectional view of the expansion assembly and processing tool of FIG. 1 taken along 2-2 of FIG. 1, where a mandrel is in an initial position.

FIG. 2B is a partial sectional view of the expansion assembly and processing tool of FIG. 1 taken along 2-2 of FIG. 1, where the mandrel is in an extended position.

FIG. 5A is a side elevational view of a sleeve of the expansion assembly of FIG. 1, according to one illustrated embodiment.

FIG. 5B is a cross-sectional view of the sleeve of FIG. 5A taken along line 5B-5B.

FIG. 5C is a top elevational view of the sleeve of FIG. 5A.

FIG. 7A is a perspective view of an expansion mandrel for expanding an expandable member, according to one illustrated embodiment.

FIG. 7B is a side elevational view of the mandrel of FIG. 7A.

FIG. 7C is a top elevational view of the mandrel of FIG. 7A.

FIG. 7D is a side cross-sectional view of the mandrel of FIG. 7A taken along line 7D-7D of FIG. 7B.

DETAILED DESCRIPTION OF THE INVENTION

In the following description, certain specific details are set forth in order to provide a thorough understanding of various embodiments of the invention. However, one skilled in the art will understand that the invention may be practiced without these details.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope of meaning of the claimed invention. The following description relates to installation/processing systems used to install expandable members (e.g., tubular bushings, fittings, sleeves, etc.) in openings, such as non-through holes in workpieces. The systems can also be used to process workpieces, such as cold working holes in workpieces. For purposes of this discussion and for clarity, a processing system for installing an expandable member will be described, and then a description of its components will follow. The term "processing system" is a broad term and includes, without limitation, a system that can be used to expand an expandable member, material surrounding a hole in a workpiece, or other suitable expandable structures. In some embodiments, processing systems are installation systems that install bushings in workpieces. The processing systems can also be in the form of cold expansion systems used to cold expand holes in workpieces. The terms "proximal" and "distal" are used to describe the illustrated embodiments and are used consistently with a description of non-limiting exemplary applications. The terms "proximal" and "distal" are used in reference to the user's body when the user operates a processing system, unless the context clearly indicates otherwise. It will be appreciated, however, that the illustrated embodiments can be located or oriented in a variety of desired positions.

Overview of Processing System

Figure 1:
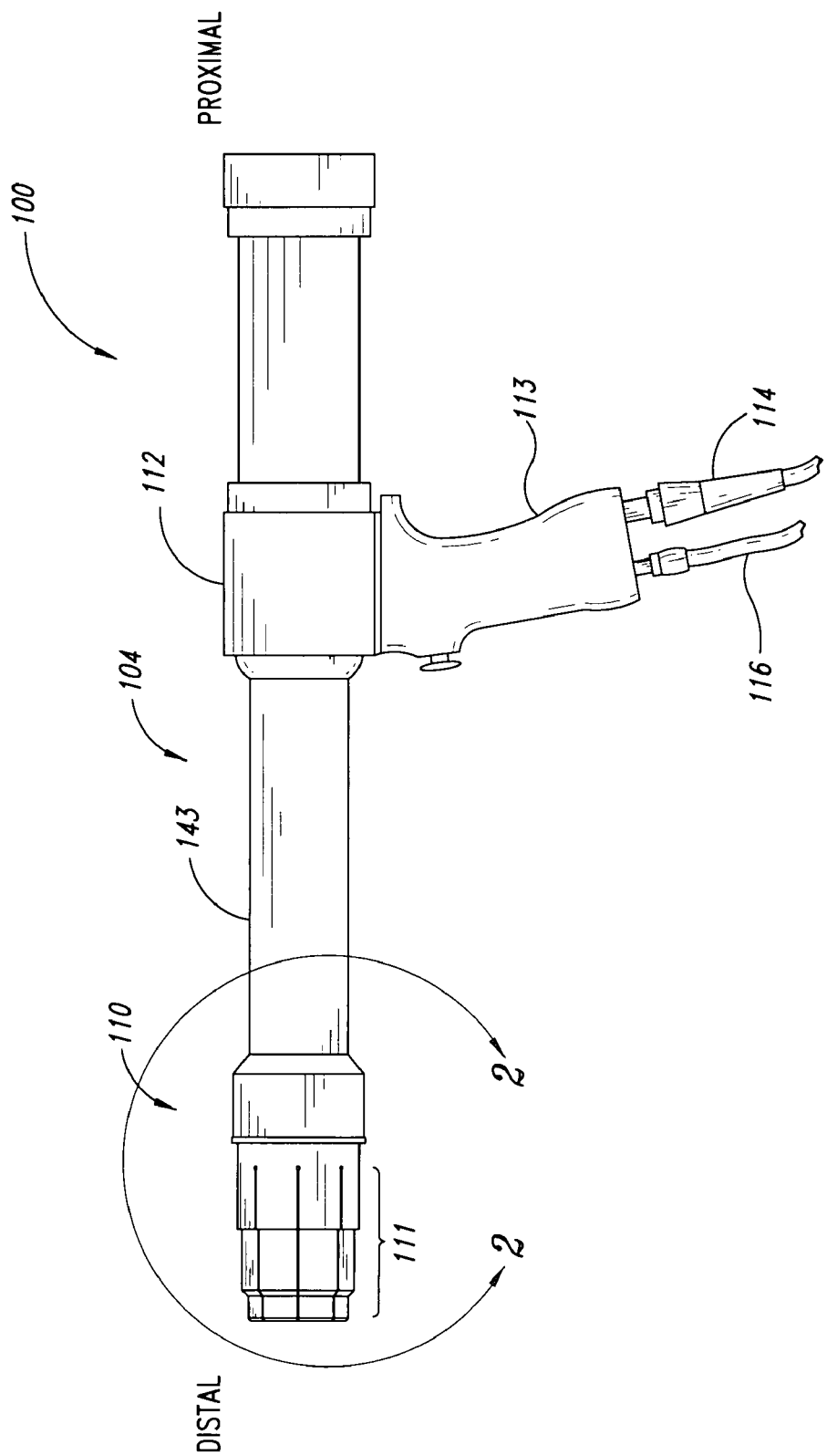
FIG. 1 is a side elevational view of a processing system having an expansion assembly coupled to a processing tool, according to one illustrated embodiment.

FIG. 1 shows a processing system 100 including a processing tool 104 and an expansion assembly 110 coupled to the processing tool 104. Generally, the illustrated processing system 100 may be used for one-sided or two-sided installation of an expandable member in a workpiece. A selectively expandable portion 111 of the expansion assembly 110 can be controllably expanded in order to expand and install the expandable member. After installation, the expandable portion 111 can be controllably contracted to separate the expansion assembly 110 from the installed expandable member.

With continued reference to FIG. 1, the processing tool 104 includes a main body 112 that is coupled to a grip 113. The user can manually grasp the grip 113 for controllably holding and accurately positioning the processing system 100. The illustrated grip 113 is a pistol grip. However, other types of grips can be utilized.

The processing tool 104 can be driven electrically, hydraulically, pneumatically, or by any other suitable drive means. The main body 112 houses a drive system 115 (shown in phantom in FIGS. 2A and 2B) that can drive a mandrel through at least a portion of the expansion assembly 110. The drive system 115 can have a push/pull piston arrangement and may comprise a double acting hydraulic cylinder. Other cylinder arrangements are also possible.

The drive system 115 of FIGS. 2A and 2B can be activated to drive a mandrel 130 along a predetermined path. The predetermined path can be a generally linear path (e.g., a line of action) extending in the proximal and distal directions. For example, the illustrated drive system 115 reciprocates the mandrel 130 distally and proximally along a predetermined path 132.

A pair of fluid lines 114, 116 of FIG. 1 can provide pressurized fluid (e.g., pressurized gas, liquid, or combinations thereof) to the drive system 115. For example, if the drive system 115 comprises a hydraulic piston arrangement, the fluid lines 114, 116 can provide pressurized hydraulic fluid.

With reference to FIG. 2A, the expansion assembly 110 comprises a cap 120 coupled to a distal portion 122 of the processing tool 104, an expansion jaw 124 coupled to the cap 120, and the movable mandrel 130. As used herein, the term "mandrel" is a broad term that includes, but is not limited to, an elongated member configured to expand an expansion jaw. The mandrel can have a one-piece or multi-piece construction. In some embodiments, the mandrel has one or more expansion portions (e.g., enlarged and/or tapered portions) which can interact with the expansion jaw so as to cause expansion of at least a portion of the expansion jaw.

Figure 3A:
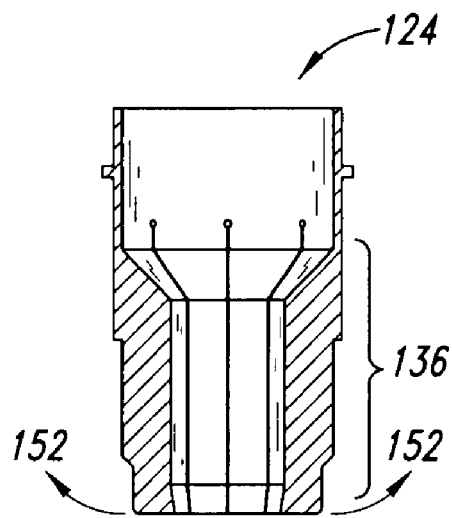
FIG. 3A is a cross-sectional view of an expansion jaw of the expansion assembly of FIG. 1, where the expansion jaw is in a first configuration.
Figure 3B:
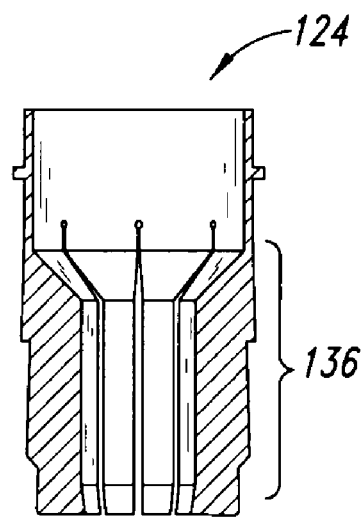
FIG. 3B is a cross-sectional view of the expansion jaw of the expansion assembly of FIG. 1, where the expansion jaw is in a second configuration.

As best seen in FIGS. 2A and 2B, the mandrel 130 can be moved distally along the path 132 from an initial position of FIG. 2A to an extended position of FIG. 2B to expand the expansion jaw 124 from a first configuration to a second configuration. For example, the mandrel 130 can drive the slotted expandable portion 111 from the collapsed configuration of FIG. 3A to the expanded configuration of FIG. 3B.

The partially or fully extended mandrel 130 can also be retracted along the path 132. When the extended mandrel 130 moves proximally along the path 132 towards its initial position, the expansion jaw 124 collapses inwardly. Once the mandrel 130 is pulled out of the expandable portion 111, the expansion jaw 124 may return to its fully collapsed configuration. In this manner, the expansion jaw 124 can be repeatedly moved between the expanded and collapsed configurations.

As shown in FIGS. 1 and 2A, the expansion jaw 124 includes a tubular main body 140 and the expandable portion 111 physically coupled to the main body 140. A working chamber 142 for receiving the mandrel 130 extends longitudinally through the expandable portion 111 and main body 140. The expandable portion 111 can define a narrowed passageway section 144 of the chamber 142. Optionally, a sleeve 150 is positioned in the narrowed passageway section 144 and may form a protective liner between the mandrel 130 and at least a portion of the expansion jaw 124, as shown in FIG. 2B.

As noted above, the processing system 100 of FIG. 1 can be used in procedures involving workpieces. As used herein, the term "workpiece" is broadly construed to include, without limitation, a parent structure having at least one hole or opening suitable for processing (e.g., receiving an expandable member, undergoing cold expansion, etc.). The hole can be, for example, a through hole, non-through hole, blind hole, counter bore, or other types of holes that may or may not have backside access. In some embodiments, the structural workpiece is a bulkhead, fuselage, engine or other structural member of an aircraft, even if there is limited or no backside access. In some embodiments, the workpiece itself may be suitable for expansion (e.g., cold expansion) and may or may not be suitable for receiving an expandable member.

Expansion Jaw

FIGS. 4A-4D show the expansion jaw 124 that can be resiliently and controllably expanded and contracted. As used herein, the term "resilient" is a broad term and includes, without limitation, being capable of withstanding working loads or movements without appreciable permanent or plastic deformation. In some embodiments, the expandable portion 111 of the resilient expansion jaw 124 can be moved from the first configuration to the second configuration repeatedly without appreciable permanent or plastic deformation. Of course, there may be a minimal degree of localized plastic yielding even though the expansion jaw 124 generally experiences elastic deformation. In some embodiments, visual inspection can be used to determine whether there is appreciable plastic deformation. After the expandable portion 111 is actuated, any plastic deformation in the expansion jaw 124 may not be recognizable upon visual inspection with the naked eye. In some preferred embodiments, the deformation of the expansion jaw 124 is substantially elastic deformation during operation. Accordingly, the resilient expansion jaw 124 can be actuated any desired number of times.

Figure 4A:
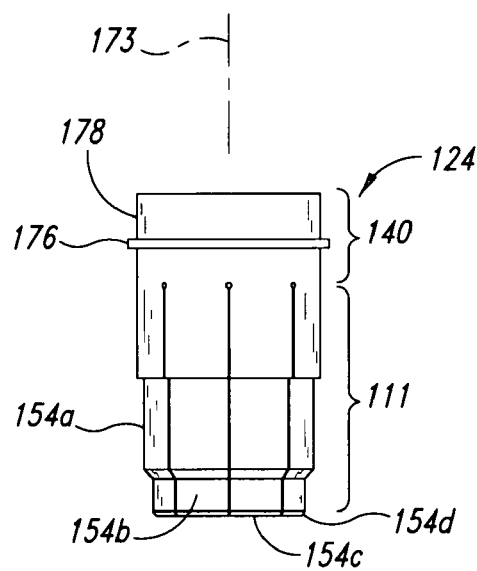
FIG. 4A is a side elevational view of the expansion jaw of the expansion assembly of FIG. 1.
Figure 4B:
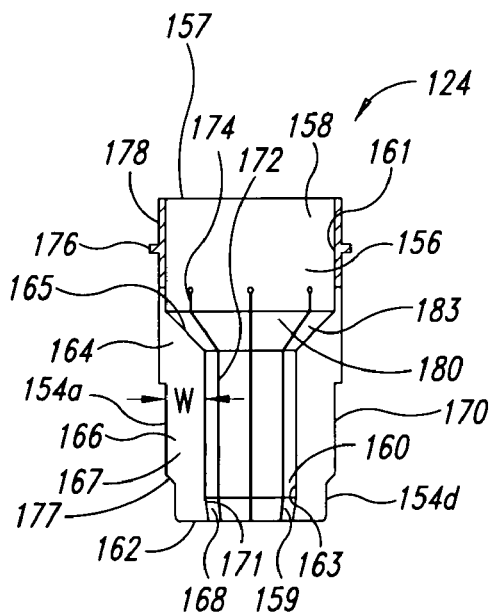
FIG. 4B is a cross-sectional view of the expansion jaw taken along line 4B-4B of FIG. 4D.
Figure 4C:
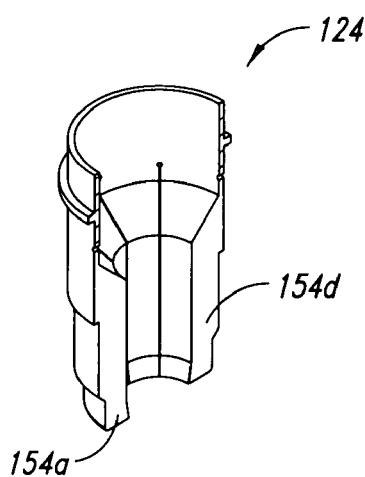
FIG. 4C is a perspective cross-sectional view of the expansion jaw taken along line 4B-4B of FIG. 4D.

With continued reference to FIG. 4B, an expandable jaw passageway 156 extends longitudinally between a first opening 157 and an opposing second opening 159. The passageway 156 is a through hole that extends through the expansion jaw 124 and comprises a first passageway section 158 extending through the main body 140, a second passageway section 160, and a transition passageway section 180 extending therebetween. A plurality of longitudinally-extending elongate members 154a-h (FIG. 4D) of the slotted expandable portion 111 define the passageway sections 160, 180. The second passageway section 160 can be a narrowed passageway.

When the mandrel 130 is advanced distally through the passageway 160, the transition passageway 180 can facilitate alignment of the mandrel 130 with the second passageway 160. For example, proximal portions 164 of the elongate members 154a-h can define sloped surfaces 183 surrounding the passageway section 180. The mandrel 130 can contact the sloped surfaces 183 as the mandrel 130 is advanced distally into the second passageway section 160.

At least a portion of the second passageway section 160 has an axial cross-sectional area that is less than an axial cross-sectional area of at least a portion of the first passageway section 158, when the elongate members 154a-h are in the initial collapsed position, as illustrated in FIGS. 4A to 4D. The axial cross-sectional area of the second passageway section 160 can also be less than the axial cross-sectional area of at least a portion of the mandrel 130. In such embodiments, the elongate members 154a-h are driven radially outward to accommodate the mandrel 130 when the mandrel 130 is driven distally into and through the second passageway section 160. The cross-sectional area of the second passageway section 160 can be increased or decreased to decrease or increase, respectively, the amount of radial displacement of each the elongate members 154a-h.

The illustrated expandable jaw passageway 156, first passageway section 158, transition passageway section 180, and second passageway section 160 each have a generally circular axial cross-section. However, the passageways of the expansion jaw 124 can have other configurations. For example, the expandable jaw passageway 156, first passageway section 158, transition passageway section 180, and/or second passageway section 160 can have elliptical, polygonal (including rounded polygonal), or any other suitable shaped cross-section for receiving an expansion mandrel.

In the illustrated embodiment of FIG. 4B, the first passageway section 158 defines a first passageway perimeter 161. The second passageway section 160 defines a second passageway perimeter 163 that is less than the first passageway perimeter 161. The transition passageway section 180 defines a transition passageway perimeter 165 that decreases from the first passageway perimeter 161 to the second passageway perimeter 163.

The elongate members 154a-h can be generally similar to each other and, accordingly, the following description of one of the elongate members applies equally to the others, unless indicated otherwise. In some embodiments, including the illustrated embodiment of FIG. 4B, the elongate member 154a includes a thickened portion 167 defining at least a portion of the second passageway section 160.

A radial width W of the thickened portion 167 can be increased or decreased to decrease or increase, respectively, the axial cross-sectional area of the second passageway section 160. The width W, for example, can be sufficiently large to limit or substantially prevent any appreciably bending of the thickened portion 167 during use, thereby producing a somewhat uniform rate of expansion along the portion of the elongate member 154a engaging the expandable member. In such embodiments, the elongate members 154a-h can expand the expandable member when the mandrel 130 is partially extended. It is contemplated that the thickened portion 167 can have a uniform or varying width W along its length.

As shown in FIG. 4B, the elongate member 154a includes a distal portion 162, the proximal portion 164, and an elongate body member 166 extending therebetween. The distal portion 162 includes a guiding section 168 for engaging the mandrel 130 when the mandrel 130 is at or near its fully extended position, as detailed below. In the illustrated embodiment, the guiding section 168 defines an inwardly facing sloped surface 171 that extends radially inward in the distal direction. The elongate member 154a can also have other types of guiding sections for engaging the mandrel 130.

The elongate body member 166 defines at least a portion of the second passageway section 160. The body 166 also defines an outer receiving portion 170 sized to engage at least a portion of an expandable member and/or workpiece. The illustrated receiving portion 170 is a circumferential recessed region formed by the outer surfaces of the elongate members 154a-h. The configuration (e.g., the length, depth, shape, etc.) of the receiving portion 170 can be selected based on the type and configuration of the expandable member to be installed. The illustrated receiving portion 170 has a stepped down portion 177 and is configured to receive a generally cylindrical bushing with a corresponding stepped down portion. Other types of expandable members, such as the fittings disclosed in U.S. patent application Ser. No. 10/633,294, which is hereby incorporated by reference in its entirety, can be mounted to the receiving portion 170.

Figure 4D:
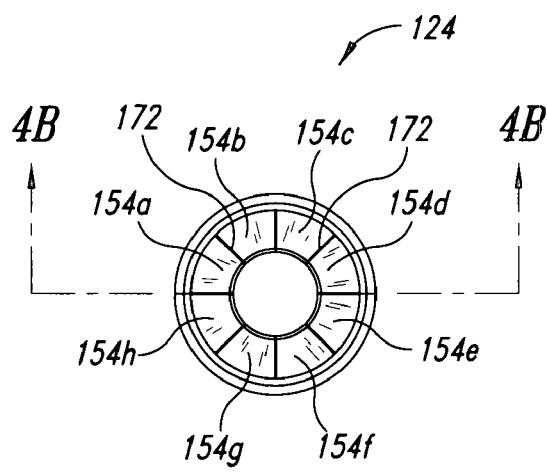
FIG. 4D is a top elevational view of the expansion jaw of FIG. 4A.
Figure 6A:
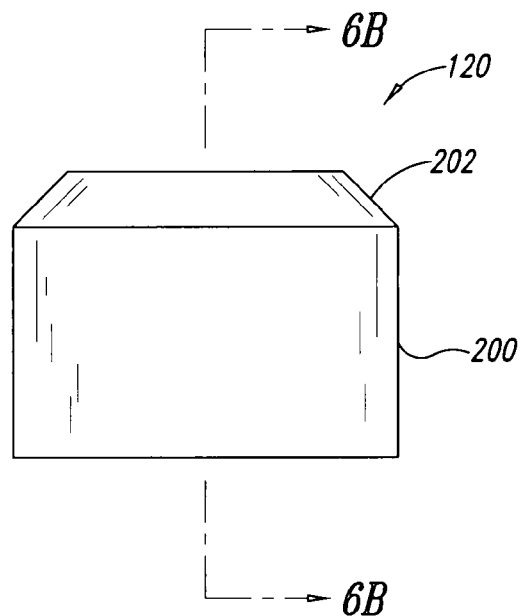
FIG. 6A is a side elevational view of a cap of the expansion assembly of FIG. 1, according to one illustrated embodiment.
Figure 6B:
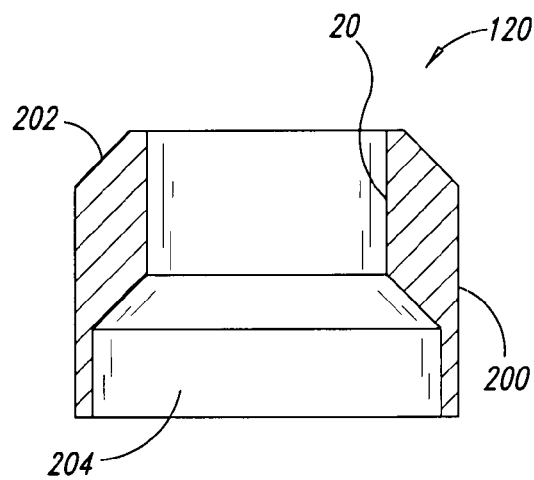
FIG. 6B is a cross-sectional view of the cap of FIG. 6A taken along line 6B-6B.
Figure 6C:
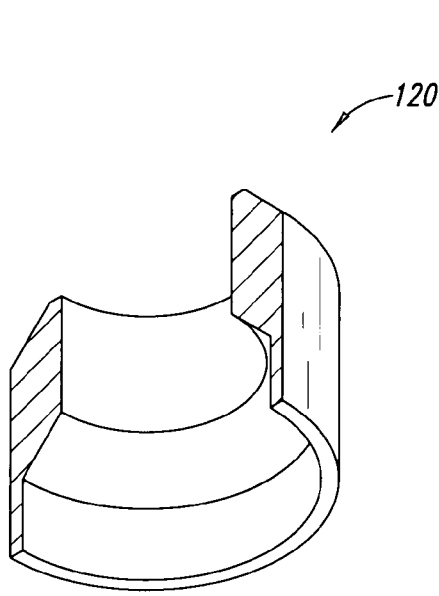
FIG. 6C is a perspective cross-sectional view of the cap of FIG. 6A taken along line 6B-6B.
Figure 6D:
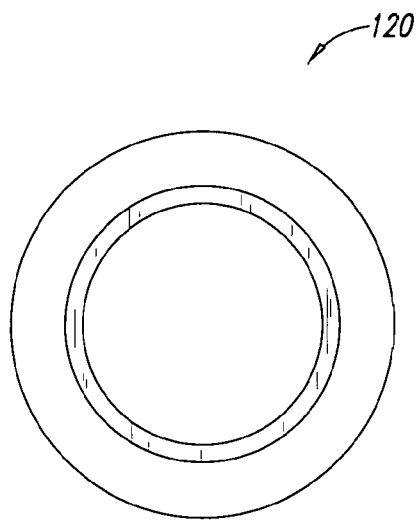
FIG. 6D is a top elevational view of the cap of FIG. 6A.

In the embodiments of FIG. 4D, the elongate members 154a-h are arranged to form a generally cylindrical tubular structure. The illustrated expansion jaw 124 includes eight elongate members 154a-h. Other numbers of elongate members are also possible. For example, the expansion jaw 124 can have three elongate members. In other embodiments, the expansion jaw 124 can have four elongate members. In other embodiments, the expansion jaw 124 can have five elongate members. In other embodiments, the expansion jaw 124 can have ten elongate members. The number of elongate members can be selected based on the procedure to be performed.

Each adjacent pair of the elongate members 154a-h forms a respective longitudinally extending slot. For example, a slot 172 (FIGS. 4B and 4D) is formed between the elongate members 154a, 154b and extends proximally past the thickened portion 167. The slots 172 can be somewhat linear, curved, arcuate, and combinations thereof, but other configurations are also possible. It is contemplated that the slots can be regularly or irregularly angularly spaced about a longitudinal axis 173 of the expansion jaw 124. In other embodiments, adjacent pairs of the elongate members 154a-h can contact each other when they are in the unexpanded position.

Optionally, the expandable jaw 124 includes a plurality of stress reducers 174 that can minimize stress concentrations to inhibit, limit, or substantially prevent crack initiation and/or crack growth. The illustrated the stress reducers 174 are through holes formed at the proximal end of each slot 172. Other types of stress reducers can also be used to enhance fatigue performance of the expansion jaw 124.

Various fabrication techniques can be used to form the elongate members 154a-h. The illustrated elongate members 154a-h are formed by cutting eight longitudinal slots in the expandable jaw 124, which may be in an expanded configuration. Other means of forming the slots can also be employed. The number of slots can be increased or decreased based on a desired number and size of the elongate members 154a-h.

After slotting the expansion jaw 124, the expansion jaw 124 can be thermally processed. For example, the expansion jaw 124 can be heat treated while a holder (e.g., a clamp) holds the elongate members 154a-h in the desired collapsed or initial position. In this manner, the elongate members 154a-h can be set in a desired position. The preset shape of the expansion jaw 124 can be selected for convenient assembling of the expansion jaw 124 and expandable member. The expansion jaw 124, for example, can be sized for a clearance fit between the receiving portion 170 and the uninstalled expandable member. Other types of fits (e.g., a shrink fit, interference fit, press fit, etc.) are also possible.

With continued reference to FIGS. 4A to 4D, the main body 140 of the expansion jaw 124 can include a seating member 176 for engaging the cap 120 and a tubular member 178. The seating member 176 is positioned midway between the proximal ends of the elongate members 154a-h and the opening 157. In the illustrated embodiment, the seating member 176 is a flange extending circumferentially around the tubular member 178 and outwardly in the radial direction. When the tubular member 178 is inserted into the cap 120, as shown in FIG. 2A, the seating member 176 can abut against the cap 120 and, consequently, act as a stop to ensure proper placement of the expandable jaw 124 within the cap 120. In alternative embodiments, the seating member 176 can include one or more stops, protrusions, seating structures, and the like.

Sleeve

FIGS. 5A to 5C show the sleeve 150 including a main sleeve body 184 and at least one sleeve mounting structure 186. The main sleeve body 184 is preferably a generally tubular structure that extends somewhat linearly from the sleeve mounting structure 186.

The sleeve 150 can be a split sleeve. As used herein, the term "split sleeve" is a broad term that includes, but is not limited to, a sleeve with one or more slits or slots, preferably extending longitudinally along the sleeve. The split sleeve may have at least one longitudinal slot formed to allow the sleeve to be conveniently expanded and/or contracted (preferably elastically). The illustrated split sleeve 150 has a longitudinally extending slit 188 (FIG. 5C) and is formed by splitting a sleeve along its entire length. In some alternative embodiments, the sleeve 150 is a split sleeve having a plurality of segmented curved members (e.g., a pair of longitudinally extending semicircular sleeve halves). In yet other embodiments, a sheet can be formed (e.g., pressed) into a somewhat cylindrical configuration such that two edges of the sheet form the longitudinal slit 188. Other fabrication methods can also be used to make the sleeve 150.

The sleeve mounting structure 186 of FIGS. 5A to 5C restrains the sleeve 150 with respect to the expansion jaw 124. The mounting structure 186 preferably axially restrains the sleeve 150 in at least one direction. In some embodiments, including the illustrated embodiment of FIG. 5A, the sleeve mounting structure 186 is in a form of a flared portion that extends outwardly forming a mounting structure surface 190 for engaging the surface 183 of the expansion jaw 124.

When the sleeve 150 is mounted within the expansion jaw 124, the sleeve mounting structure 186 can inhibit, minimize, or substantially prevent axial movement of the sleeve 150 relative to the expansion jaw 124. In some embodiments, the angle of the surface 190 can be generally similar to the angle of the surface 183 of the expansion jaw 124. In alternative embodiments, the sleeve 150 can have one or more flanges, external threads, protrusions, pins, or other sleeve mounting structures for coupling the sleeve 150 to the expansion jaw 124.

An outer surface 192 of the sleeve 150 can engage the inner surface of the expansion jaw 124 when the sleeve 150 is assembled with the jaw 124. An inner surface 196 of the sleeve 150 can be suitable for slidably engaging the mandrel 130 when the mandrel 130 moved through the sleeve 150. The inner surface 196 can define the sleeve passageway 198 extending through the sleeve 150.

Expandable Member

As noted above, the processing system 100 of FIG. 1 may be used to install expandable members. As used herein, the term "expandable member" is a broad term and includes, but is not limited to, a bushing, washer, sleeve (including a split sleeve), fitting, fastener, nut plate, structural expandable member (e.g., expandable members that are incorporated into structural workpieces), and other structures that are suitable for coupling to a workpiece. In some embodiments, the expandable member can be expanded from a first configuration (pre-installed configuration) to a second configuration (installed configuration). For example, the expandable member may be a bushing that is radially expanded an amount sufficient to form an interference fit with a hole in a workpiece. The term expandable member refers to a member in a pre-expanded state and a post-expanded state, unless the context dictates otherwise.

In some embodiments, the expandable member is in a form of a non-through hole expandable member. As used herein, the term "non-through hole expandable member" is a broad term and includes, but is not limited to, an expandable member which is sized and dimensioned to fit within a non-through hole, such as a blind hole or other hole that does not extend completely through a workpiece, or otherwise has limited backside access.

Various types of expansion processes can be employed to expand the expandable members. In a cold expansion process, for example, the expandable member is radially expanded, without appreciably raising the temperature of the expandable member, to produce residual stresses in a workpiece and/or expandable member to enhance fatigue performance. The residual stresses are preferably compressive stresses that can minimize, limit, inhibit, or substantially prevent initiation and/or crack propagation.

Cap

FIGS. 6A to 6D show the cap 120 including a receiving portion 200 for engaging the expansion jaw 124 and an opposing coupling portion 202 for temporarily or permanently coupling to the processing tool 104. The receiving portion 200 defines an opening 204 for receiving at least a portion of the main body 140 of the expansion jaw 124.

The cap 120 can be directly or indirectly coupled to the processing tool 104. In the illustrated embodiment of FIG. 2A, the cap 120 is directly coupled to the processing tool 104. Different types of coupling arrangements can be used to couple the cap 120 to the processing tool 104. For example, the cap 120 can be threadably coupled to the processing tool 104. Internal threads of the cap 120 can threadably mate with external threads of the processing tool 104. Additionally or alternatively, one or more mechanical couplers (e.g., nut and bolt assemblies), pins, locking members, or fasteners can be used to couple the cap 120 to the processing tool 104. In yet other embodiments, the cap 120 can be integrally formed with the processing tool 104. For example, the cap 120 can be monolithically formed with the external housing 143 of the processing tool 104.

The cap 120 can also be indirectly coupled to the processing tool 104. An intermediate adapter (or other components) can connect the cap 120 and processing tool 104.

Mandrel

FIGS. 7A to 7D illustrate the mandrel 130 including an elongate shaft 210 and an enlarged head 212 coupled to a distal end 214 of the shaft 210. A proximal end 216 of the shaft 210 is configured and dimensioned for insertion into the processing tool 104. The shaft 210 can be a rod, link, shank, elongate member, or other member suitable for connecting the head 212 to the processing tool 104.

The enlarged head 212 includes a mounting member 224 receivable by the distal end 214 of the shaft 210. The illustrated mounting member 224 is a centrally disposed protrusion that extends into a hole 226 of the distal end 214. Other mounting arrangements can also be used.

Figure 8:
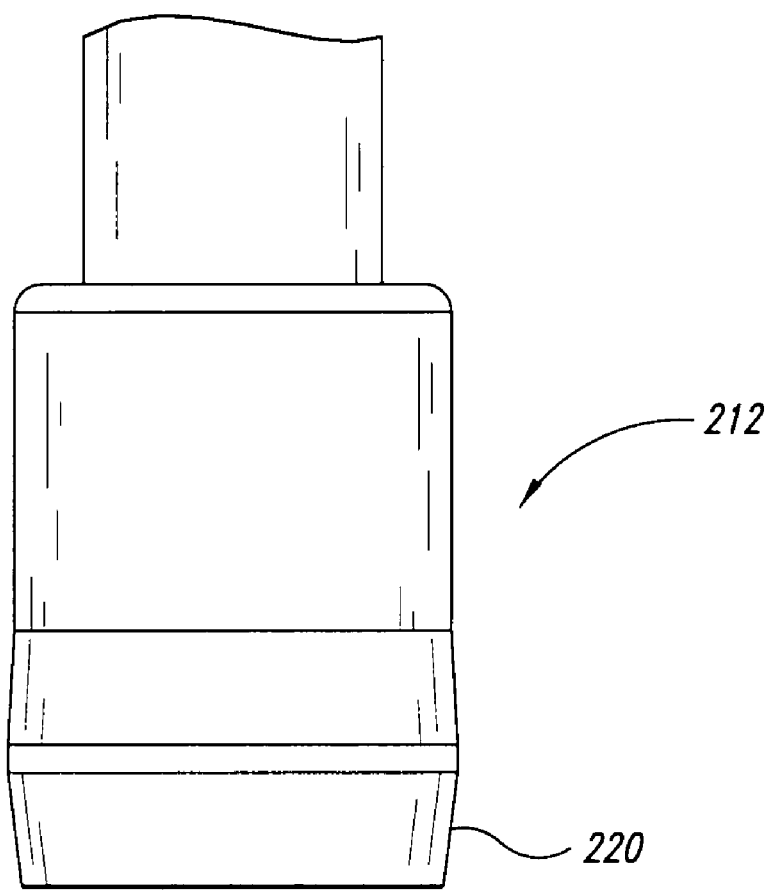
FIG. 8 is an enlarged side elevational view of the mandrel of FIG. 7A taken along 8-8 of FIG. 7B.

As shown in FIG. 8, the head 212 includes a mandrel guiding portion 220 for guiding the head 212. The illustrated guiding portion 220 tapers inwardly in the distal direction to advantageously minimize or reduce the force required to actuate the mandrel 130 distally through the expansion jaw 124. A beveling process can form the guiding portion 220.

Methods of Using the Processing System

Figure 9:
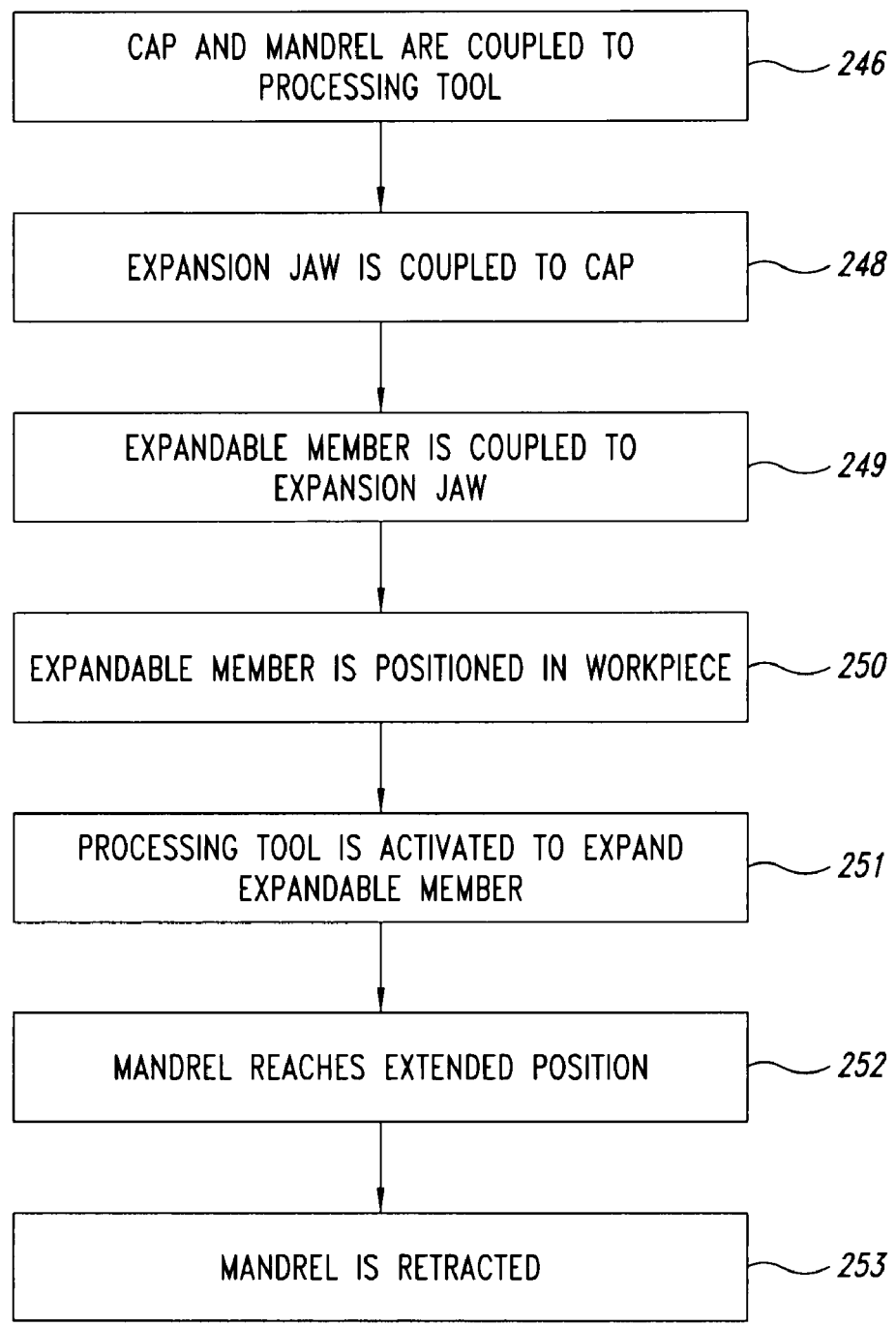
FIG. 9 is a flowchart showing a method of installing an expandable member, according to one embodiment.
Figure 10:
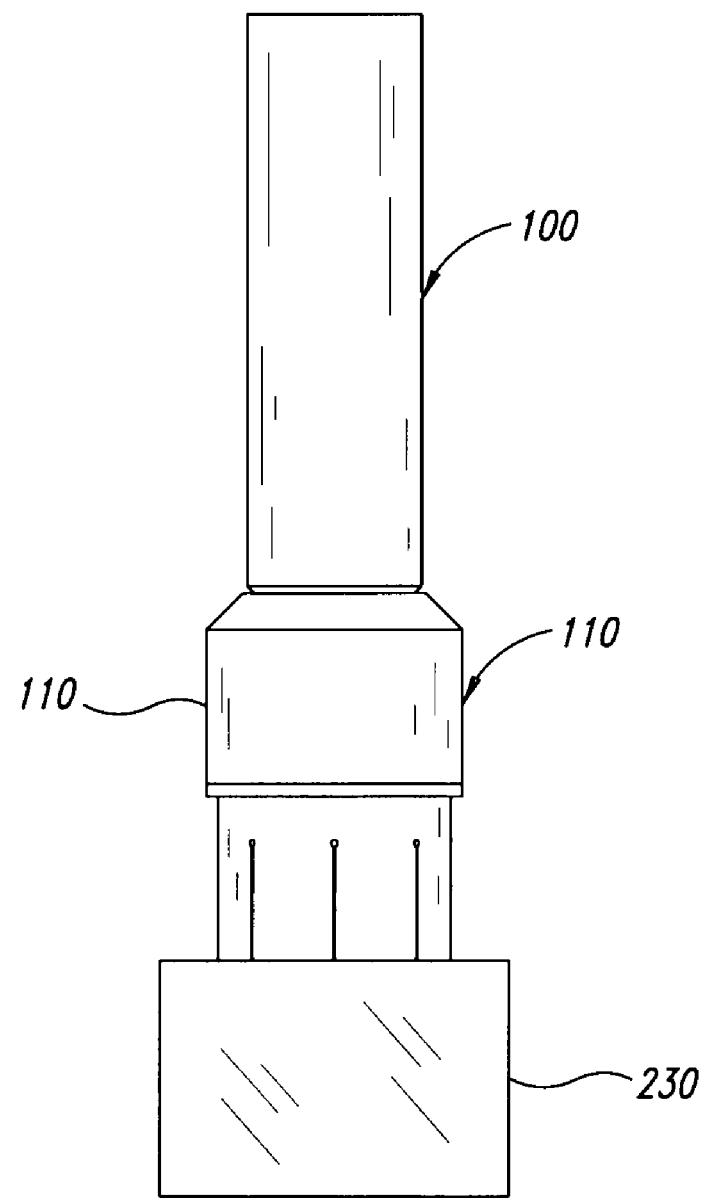
FIG. 10 is a side elevational view of an expansion assembly in operative engagement with a workpiece.

FIG. 9 is a flowchart showing a method of installing an expandable member according to one embodiment. Generally, the expansion assembly 110 is coupled to the processing tool 104. At 246, the cap 120 is coupled to the housing 143 of the processing tool 104 and can surround the mandrel 130, as illustrated in FIG. 2A. The mandrel 130 can be coupled to the processing tool 104 before or after the cap 120 is mounted to the processing tool 104.

At 248, the expansion jaw 124 can be coupled to the cap 120. The sleeve 150 may or may not be assembled with the expansion jaw 124. In the illustrated embodiment, the sleeve 150 is inserted through the first passageway section 158 and advanced distally through the passageway 156. The sleeve 150 is then inserted into the second passageway section 160 until the sleeve mounting structure 186 contacts the surface 183. The sleeve 150 can press outwardly on the expansion jaw 124 so as to inhibit, limit, or substantially prevent movement of an expandable member on the expansion jaw 124. In other embodiments, the expansion jaw 124 without the sleeve 150 is coupled to the cap 120. Additionally or alternatively, the expansion jaw 124 can contain a liner, lubricant, combinations thereof, or other structure that reduces or increases the frictional interaction between the mandrel 130 and expansion jaw 124. In some embodiments, a friction reducer in the form of a lubricant is applied to the bearing surfaces of the expansion jaw 124, sleeve 150, and/or mandrel 130. For example, the inner surfaces of the expansion jaw 124 can be coated with a lubricant for minimizing frictional interaction between the head 212 of the mandrel 130 and expansion jaw 124. A coating (e.g., polymer, such as synthetic risens like polytetrafluoroethylene (PTFE), TEFLON®, nylon, NEDOX® CR+, blends, mixtures, etc.) can be used to reduce frictional forces. Other surface treatments can be used to achieve the desired frictional interaction between moving components of the processing system 100.

To assemble the expansion jaw 124 and cap 120, the main body 140 of the expansion jaw 124 is inserted into the opening 204 of the cap 120. The tubular member 178 is advanced into the cap 120 until the seating flange 176 is near or contacts the cap 120.

At 249, an expandable member 232 (see FIG. 11) is coupled to the expansion jaw 124. It is contemplated that the member 232 can be coupled to the jaw 124 before, during, or after the expansion jaw 124 is coupled to the cap 120. In the method of FIG. 9, the expandable member 232 is coupled to the expansion jaw 124 after the expansion jaw 124 is coupled to the cap 120. In alternative embodiments, the expansion jaw 124 is preloaded with the expandable member 232. The preloaded expansion jaw 124 is then coupled to the cap 120.

To couple the expandable member 232 to the expansion jaw 124, the outer receiving portion 170 of the expansion jaw 124 is inserted into the expandable member 232. The receiving portion 170 can mate with a complimentary shaped portion of the member 232. Once the expandable member 232 is properly positioned along the receiving portion 170, the processing system 100 is ready for installation.

The expansion jaw 124 (preferably in the fully collapsed configuration or partially expanded configuration) can be sized to tightly receive the expandable member 232 to form, for example, an interference fit (e.g., a slight interference fit). In other embodiments, the expansion jaw 124 is sized to allow some play between the expandable member 232 and expansion jaw 124.

Figure 11:
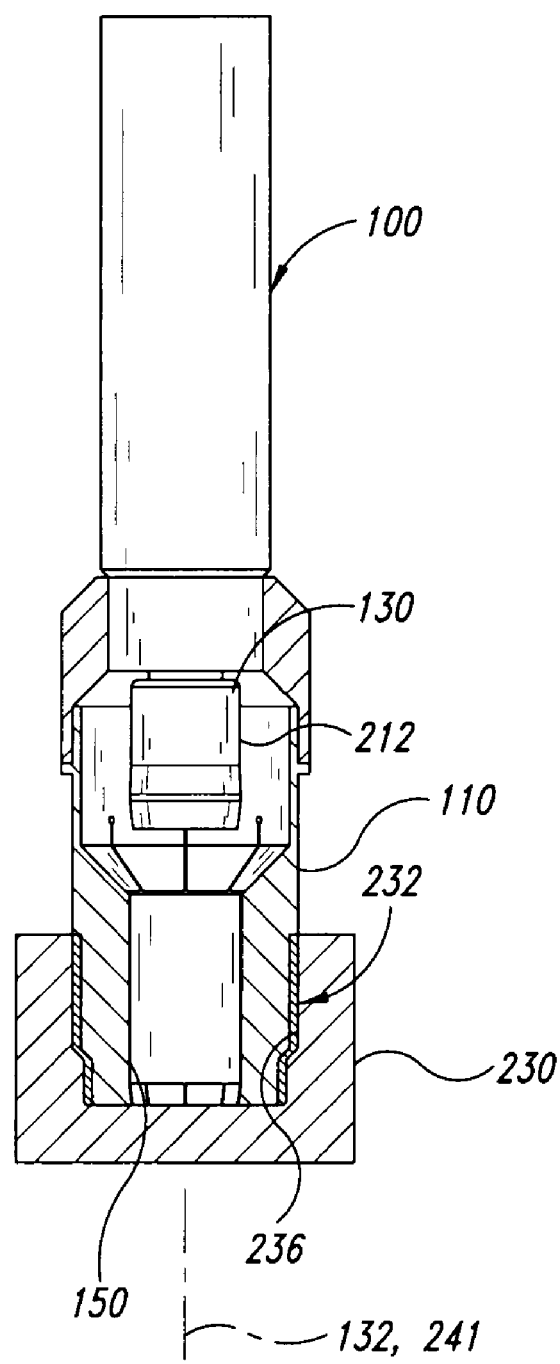
FIG. 11 is a partial cross-sectional view of the expansion assembly and workpiece of FIG. 10 where a mandrel is in an initial position and an expandable member is interposed between the expansion assembly and workpiece.

At 250, the assembled processing system 100 positions the expandable member 232 in the workpiece 230, as shown in FIGS. 10-13. As shown in FIG. 11, the expandable member 232 can be disposed within a blind hole 236 of the workpiece 230. The processing system 100 can thus be used to expand the member 232 even though there is limited or no backside access. To position the expandable member 232 in the workpiece 230, the unexpanded expansion jaw 124 and associated expandable member 232 are inserted into the hole 236. In some embodiments, the hole 236 can be sized to closely receive the expandable member 232 to form a slight interference fit.

Figure 12:
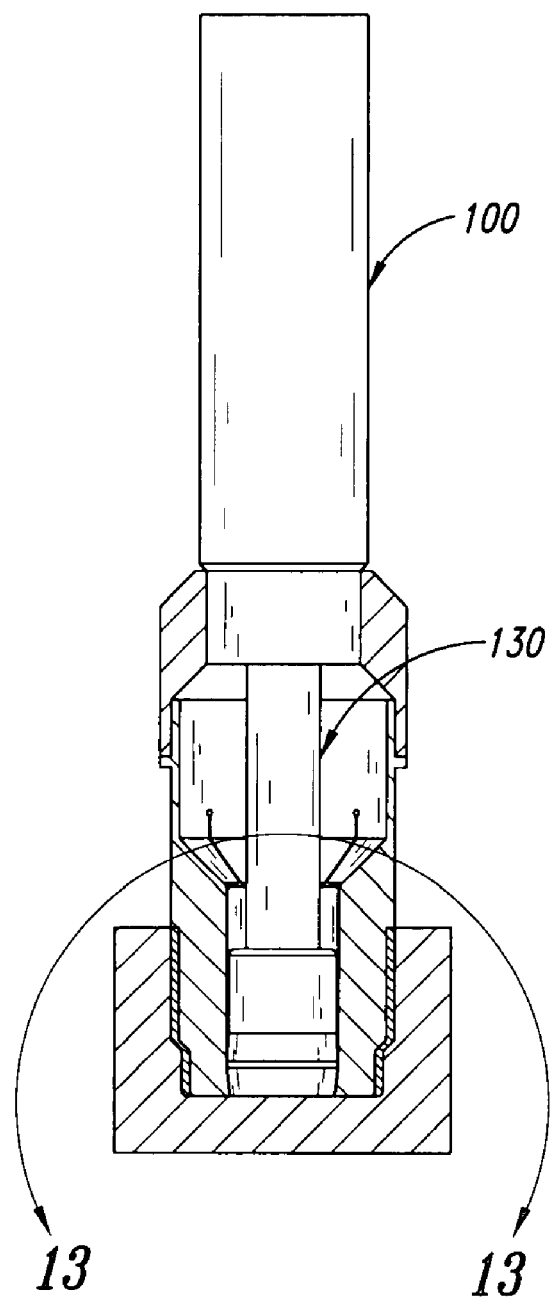
FIG. 12 is a partial cross-sectional view of the expansion assembly and workpiece of FIG. 10 where the mandrel is in an extended position.
Figure 13:
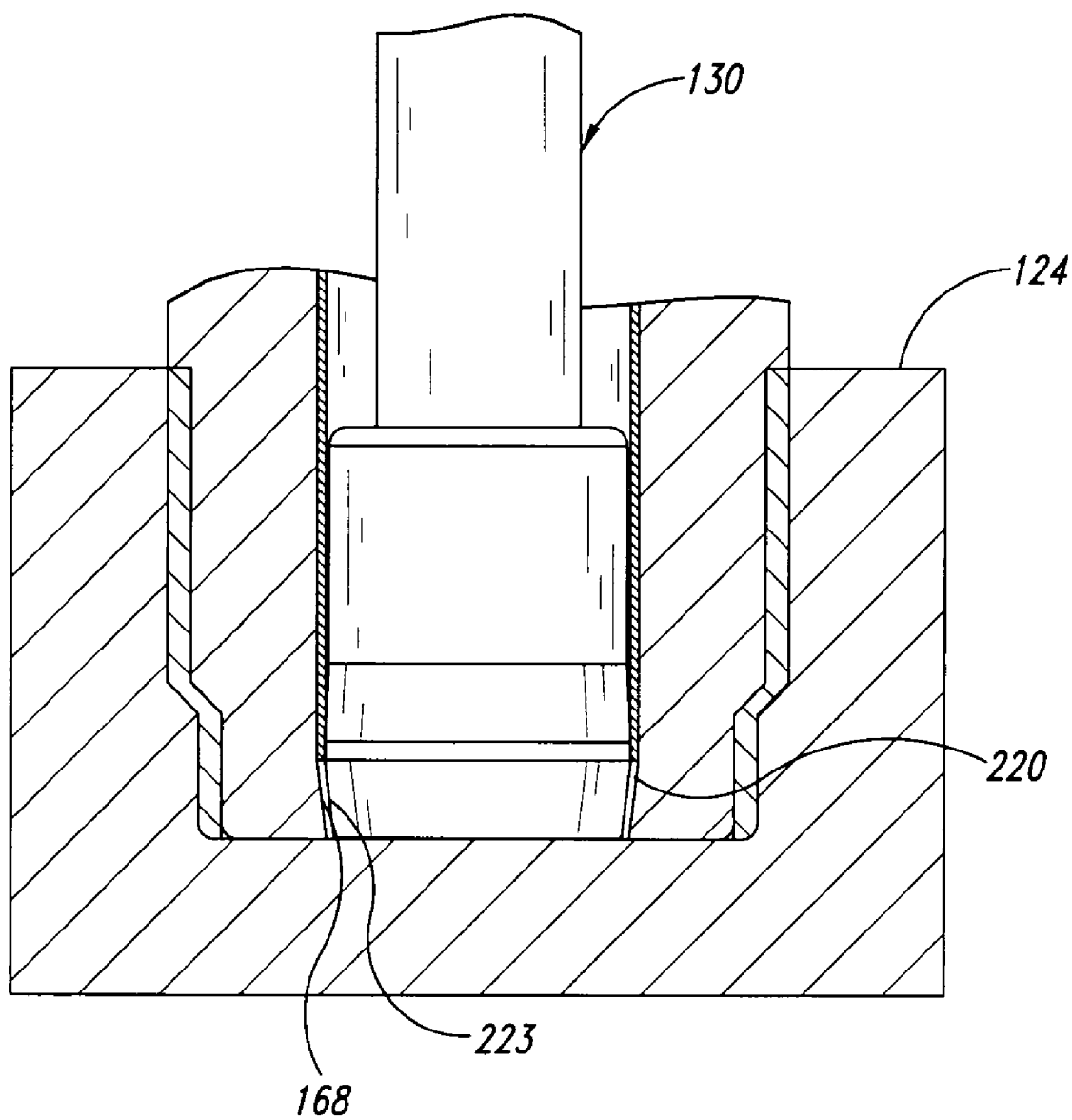
FIG. 13 is an enlarged cross-sectional view of the expansion assembly and workpiece taken along 13-13 of FIG. 12.

At 251, the processing tool 104 is activated to drive the head 212 of the mandrel 130 along the predetermined path 132 distally from the initial position of FIG. 11 to towards the workpiece 230 to the extended position of FIG. 12. When the guiding portion 220 of the head 212 contacts the sleeve 150, the head 212 initiates the expansion process. As the head 212 is advanced distally through the sleeve 150, the head 212 applies outwardly directed forces to the sleeve 150 causing expansion of the sleeve 150 and associated expansion jaw 124, which in turn expands the member 232. The sleeve 150 is generally axially fixed relative to the expansion jaw 124 as the mandrel 130 is moved through the sleeve passageway 198.

During the expansion process, the elongate members 154*a-h* are generally expanded radially outward. In the illustrated embodiment, the elongate members 154*a-h* can pivot about the junction of the members 154*a-h* and the tubular main body 140. As such, the portions of the elongate members 154*a-h* contacting the expandable member 232 can be generally expanded uniformly along their lengths, thereby ensuring proper placement of the expandable member 232 in the hole 236. This uniform expansion can minimize, limit, or substantially prevent axial displacement of the expandable member 232 relative to the hole 236. The expandable member 232, for example, can be generally axially fixed relative to the longitudinal axis 241 of the hole 236 during the expansion process. In some embodiments, the path 132 and longitudinal axis 241 are generally collinear.

The elongate members 154*a-h* can be sufficiently rigid so as to radially expand the expandable member 232 when the expansion mandrel 130 is moved through the second passageway section 160. In some embodiments, the elongate members 154*a-h* extend through the entire expandable member 232. That is, the members 154*a-h* can extend through a front side and back side of the expandable member 232. The elongate members 154*a-h* can expand the front side and back side of the member 232 at generally the same rate, if desired.

Advantageously, the expansion jaw 124 can protect the expandable member 232 from the linear movement of the mandrel 130. As the expansion jaw 124 expands outwardly, the expansion jaw 124 can be axially stationary relative to the hole 236, thus minimizing, limiting, or preventing frictional interaction and wear between the expansion jaw 124 and expandable member 232.

The processing system 100 can be used with one or more clamps or other positioning devices. If the installer has backside access, a clamp (e.g., a C-clamp) can help position the processing tool 104 relative to the workpiece 230. The processing system 100 can also be used without a positioning device, unlike traditional mandrel installation systems. Traditional mandrel installation systems react relatively large axial reactive forces to the installer requiring clamping devices for proper installation. These axial forces may cause undesirable movement between a bushing and workpiece, thus requiring a clamp for proper installation.

Because the expansion jaw 124 expands generally radially outward (not linearly through the expandable member), the expansion jaw 124 can be easily held within the expandable member 232 without using a clamp. The reactive forces from the mandrel 130 are transferred to the processing tool 104 via the cap 120. The installer can conveniently position the expansion assembly 110 and expandable member 232 within the workpiece 230 with minimal insertion forces, thereby eliminating the need for any clamps. The installer can therefore manually hold the processing tool 104 in proper position during the expansion process without the need of clamps or other holding devices.

At 252, the mandrel 130 reaches its full stroke. The guiding portion 220 of the head 212 preferably engages or is proximate the guiding section 168 of the expansion jaw 124, as shown in FIG. 12. The angle of the tapered guiding section 168 can generally match the angle of an outer surface 223 of the guiding portion 220. The tapered guiding section 168 can act as a stop to ensure that the mandrel 130 does not protrude from the expansion jaw 124 and damage the workpiece 230 and/or cause movement of the expandable member 232 relative to the workpiece 230.

At 253, the mandrel 130 is pulled proximally through the expansion assembly 110 until it reaches its initial position. As the head 212 is pulled through the expansion jaw 124, the elongate members 154a-h bias inwardly such that the expansion jaw 124 collapses. The elongate members 154a-h can therefore return to their original collapsed position.

To facilitate removal from the installed expandable member 232, a clearance fit can be formed between the collapsed expansion jaw 124 and expandable member 232. Accordingly, the expansion assembly 110 can be easily removed from the expandable member 232 and used again to install another expandable member.

Figure 14:
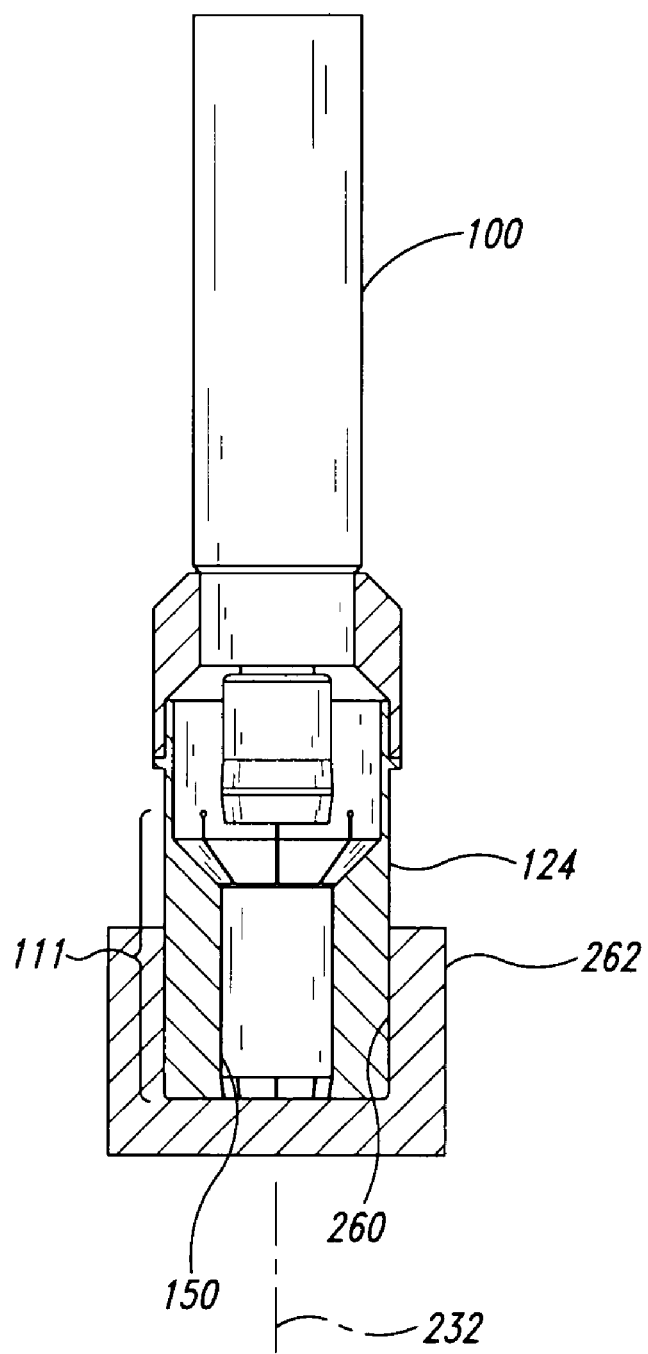
FIG. 14 is a partial cross-sectional view of an expansion assembly and a workpiece, according to one embodiment.

The processing system 100 of FIG. 1 can also be used to treat one or more features of a workpiece. The processing system 100, for example, can be used to expand a hole in a similar manner as the expandable member 232 described above. As shown in FIG. 14, the processing system 100 can treat a hole 260 in a workpiece 262. At least a portion of the expandable portion 111 of the expansion jaw 124 can be inserted into the hole 260. The processing tool 104 can be activated to expand the expansion jaw 124 and associated hole 260. For cold expansion, the expandable portion 111 can be expanded to cold work the hole 260 to produce residual stresses in the material forming the hole 260. Of course, the processing system 100 can also be used to perform other types of expansion processes.

All patents and publications mentioned herein are hereby incorporated by reference in their entireties. Except as described herein, the embodiments, features, systems, devices, materials, methods and techniques described herein may, in some embodiments, be similar to any one or more of the embodiments, features, systems, devices, materials, methods and techniques described in U.S. Pat. Nos. 3,566,662; 3,892,121; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,111; 5,433,100; and in U.S. patent application Ser. Nos. 09/603,857; 10/726,809; 10/619,226; and 10/633,294, which are incorporated herein by reference. In addition, the embodiments, features, systems, devices, materials, methods and techniques described herein may, in certain embodiments, be applied to or used in connection with any one or more of the embodiments, features, systems, devices, materials, methods and techniques disclosed in the incorporated U.S. Patents and Patent Applications.

The articles disclosed herein may be formed through any suitable means. For example, the articles can be formed through injection molding, machining, and other methods disclosed herein. The various methods and techniques described above provide a number of ways to carryout the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and acts discussed above, as well as other known equivalents for each such feature or act, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. An installation system, comprising:
an expansion jaw for processing a workpiece, the expansion jaw comprising:
a main body having a first end and an opposing second end;
a plurality of longitudinally-extending elongate members coupled to the second end of the main body, each of the elongate members resiliently movable between a collapsed position and an expanded position; and
an expansion jaw passageway dimensioned to receive an expansion mandrel, the passageway comprising:
a first passageway section having a first cross-sectional area extending through the main body; and
a second passageway section connected to the first passageway section, the second passageway section surrounded by the plurality of elongate members, at least a portion of the second passageway section having a second cross-sectional area that is less than the first cross-sectional area of the first passageway section such that each of the elongate members moves between the collapsed position and the expanded position when an expansion mandrel is moved through the second passageway section; and
a sleeve positioned in the expansion jaw passageway, the sleeve located between the plurality of elongate members and the expansion mandrel when the expansion mandrel is positioned in the second passageway section.

2. The installation system of claim 1 wherein the plurality of elongate members are positioned so as to form a generally tubular body, wherein each adjacent pair of elongate members defines a respective elongated slot.

3. The installation system of claim 1 wherein each elongate member has a tapered section and a thickened section, the tapered section is disposed axially between the main body and the thickened section, and the tapered sections cooperate to form a transitioning passageway section connecting the first passageway section and the second passageway section.

4. The installation system of claim 3 wherein the tapered sections are positioned to guide the expansion mandrel into the second passageway section when the expansion mandrel is moved through the main body towards the second passageway section.

5. The installation system of claim 1 wherein the first end of the main body is configured to be coupled to a nose cap that is dimensioned to be coupled to a processing tool capable of actuating an expansion mandrel through the nose cap and the expansion jaw.

6. The installation system of claim 1 wherein the first end of the main body is configured to be coupled to a processing tool capable of actuating a mandrel.

7. The installation system of claim 1 wherein the elongate members are sufficiently rigid so as to radially expand an expandable member to cold work the workpiece when the expansion mandrel is moved through the second passageway section.

8. The installation system of claim 7 wherein the elongate members are configured to radially expand a front side and a back side of the expandable member through which the elongate members extend.

9. A system for processing a workpiece, the system comprising:
- an expansion mandrel having a distal portion and a proximal portion;
- an expansion jaw having a main body, an expandable portion connected to the main body, and a passageway extending through the expandable portion and the main body, the passageway comprises a narrowed section positioned along the expandable portion; and
- an actuating device coupleable to the expansion jaw and the proximal portion of the expansion mandrel, the actuating device being configured to move the expansion mandrel through the narrowed section of the passageway to resiliently expand the expandable portion outwardly an amount sufficient to install an expandable member or cold expand a hole in the workpiece so as to induce fatigue enhancing residual compressive stresses in the workpiece, wherein the actuating device is configured and the expansion mandrel is dimensioned to keep a distal end of the mandrel within the passageway of the expansion jaw while producing the fatigue enhancing residual compressive stresses in the workpiece.

10. The system of claim 9 wherein the main body is a continuous tubular body, and the expandable portion is a slotted tubular body extending from the main body.

11. The system of claim 9 wherein the expandable portion has a thickened portion forming the narrowed section.

12. The system of claim 9 wherein the expandable portion comprises a tubular member having a plurality of longitudinally-extending slots, the slots angularly spaced from each other about a longitudinal axis of the expansion jaw.

13. The system of claim 12 wherein the slots are generally evenly spaced from each other.

14. The system of claim 9 wherein the expandable portion comprises a plurality of longitudinally-extending elongate members coupled to an end of the main body.

15. The system of claim 9 wherein the expandable portion is dimensioned to fit in an opening of an expandable member when the expandable member is positioned within a hole of a workpiece.

16. The system of claim 9, wherein the fatigue enhancing residual stresses are induced without having the expansion mandrel protrude out an end of the expansion jaw in the workpiece.

17. A system for processing a workpiece, the system comprising:
- an expansion mandrel having a distal portion and a proximal portion, the proximal portion configured to engage an actuating device;
- an expansion jaw having a main body, an expandable portion connected to the main body, and a passageway extending through the expandable portion and the main body, the passageway including a narrowed section positioned along the expandable portion such that the expandable portion resiliently expands outwardly an amount sufficient to install an expandable member or cold expand a hole in the workpiece when the distal portion of the expansion mandrel is moved distally through the passageway; and
- a sleeve having a sleeve passageway extending therethrough, the sleeve passageway sized to receive the distal portion of the mandrel such that the sleeve is interposed between the expandable portion and the distal portion of the mandrel when the mandrel is moved along the sleeve passageway causing expansion of the sleeve and expandable portion.

18. A system for processing a workpiece, the system comprising:
- an expansion mandrel having a distal portion and a proximal portion, the proximal portion configured to engage an actuating device;
- an expansion jaw having a main body, an expandable portion connected to the main body, and a passageway extending through the expandable portion and the main body, the passageway including a narrowed section positioned along the expandable portion such that the expandable portion resiliently expands outwardly an amount sufficient to install an expandable member or cold expand a hole in the workpiece when the distal portion of the expansion mandrel is moved distally through the passageway; and
- a sleeve having a coupling portion, a body portion, and a sleeve passageway extending therethrough, the coupling portion configured to couple to the expansion jaw such that the sleeve is generally axially fixed relative to the expansion jaw as the mandrel is moved through the sleeve passageway when the sleeve is positioned within the expansion jaw.

19. An installation system, comprising:
tubular expansion jaw, comprising:
- a main body having a passageway for receiving an expansion mandrel;
- means for expanding a member in a workpiece when the expansion mandrel is moved through at least a portion of the means for expanding, the means for expanding dimensioned to fit within a hole in the member, and the means for expanding being coupled to the main body; and
an actuation device coupled to the tubular expansion jaw, the actuation device configured to move the expansion mandrel through a passageway of the means for expanding the member in the workpiece to induce fatigue enhancing residual compressive stresses in the workpiece without having the expansion mandrel protrude out an end of the tubular expansion jaw in the workpiece.

20. The installation system of claim 19 wherein the means for expanding expands generally radially outward from a longitudinal axis of the means for expanding in response to the mandrel moving therethrough.

21. The installation system of claim 20 wherein the means for expanding comprises a slotted member movable between an unexpanded configuration for insertion into the member and an expanded configuration for expanding the member.

22. An installation system for processing a workpiece, comprising:
an expansion jaw comprising:
- a plurality elongate members resiliently movable between a collapsed position and an expanded position; and
- an expansion jaw passageway dimensioned to receive an expansion mandrel; and a sleeve positioned in the expansion jaw passageway, the sleeve located between the plurality of elongate members and the expansion mandrel when the expansion mandrel is moved through the expansion jaw by an installation tool to move the plurality elongate members towards the expanded position.

23. The installation system of claim 22, wherein the sleeve includes a coupling portion, a body portion, and a sleeve passageway extending therethrough, the coupling portion configured to couple to the expansion jaw to axially fixed the sleeve relative to the expansion jaw as the mandrel is moved through the sleeve passageway.

24. An installation system for installing an expandable member in a workpiece, comprising:

an expansion jaw for processing the workpiece, the expansion jaw comprising:

a main body;

a plurality of longitudinally-extending elongate members coupled to the main body, the elongate members resiliently movable between a first position and a second position and including outer sections and inner sections;

an expansion jaw passageway dimensioned to receive an expansion mandrel, the expansion jaw passageway extending through the main body;

a circumferential recess defined by the outer sections of the elongate members, the circumferential recess configured to receive the expandable member that is expanded as the elongate members move towards the second position, the inner sections of the elongate members surrounding the expansion jaw passageway; and a sleeve positioned in the expansion jaw such that the sleeve is interposed between the plurality of elongate members and an expansion mandrel when the expansion mandrel is positioned in the expansion jaw passageway.

25. The installation system of claim 24, wherein the circumferential recess extends along most of a longitudinal length of the elongate members.

* * * * *